Figure 1:
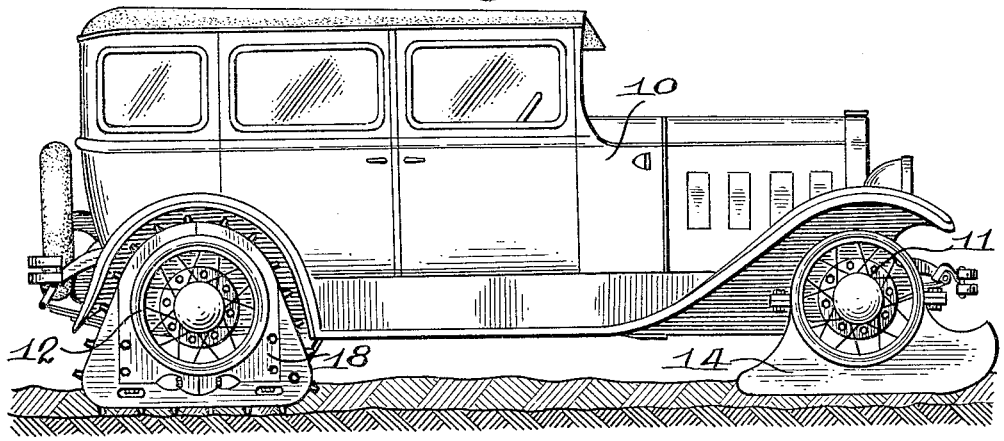

May 2, 1933.   J. S. D. BELLERIVE   1,907,236
DRIVE ATTACHMENT FOR VEHICLES
Filed July 11, 1932   2 Sheets-Sheet 1

Inventor
Joseph S. D. Bellerive

Attorneys

May 2, 1933. J. S. D. BELLERIVE 1,907,236
DRIVE ATTACHMENT FOR VEHICLES
Filed July 11, 1932 2 Sheets-Sheet 2
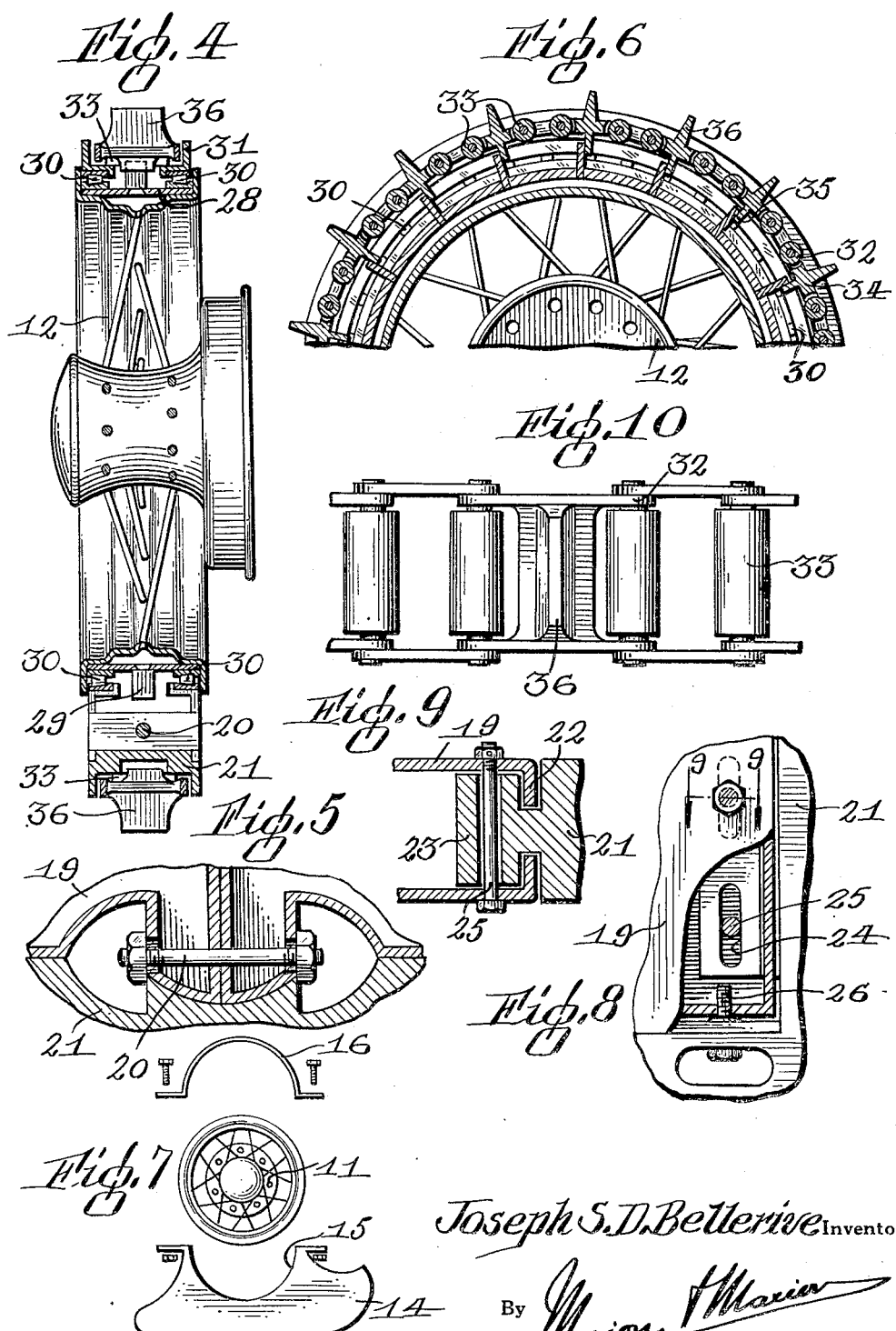
Joseph S. D. Bellerive Inventor
By Marion & Marion
Attorneys Patented May 2, 1933

1,907,236

UNITED STATES PATENT OFFICE

JOSEPH S. D. BELLERIVE, OF ST. AGATHE DES MONTS, QUEBEC, CANADA

DRIVE ATTACHMENT FOR VEHICLES

Application filed July 11, 1932. Serial No. 621,867.

The present invention relates to improvements in drive attachments for vehicles whereby the same may be effectively driven over snow covered surfaces.

An important object of the invention is the provision of a drive mechanism adapted to be connected to the drive wheels of a motor vehicle designed to enable effective operation of the vehicle on snow.

A further object of the invention is the provision of a drive attachment of the above character including runners detachably connected with the front steering wheels of a vehicle.

Another object of the invention is the provision of a drive attachment adapted to provide an effective gripping means for propelling a vehicle and which will operate with a minimum of noise.

Still another object of the invention is the provision of a drive attachment of the above type which will be somewhat flexible to allow predetermined movement over uneven surfaces.

Still another object of the invention is the provision of drive mechanism of the above character which will be efficient and reliable in operation.

Other objects and advantages of the invention will become apparent as the description progresses.

Figure 2:
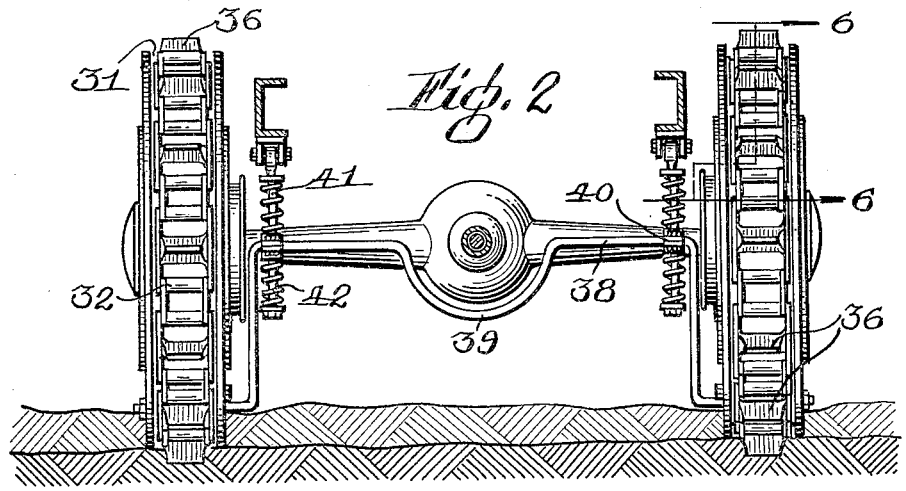
Figure 3:
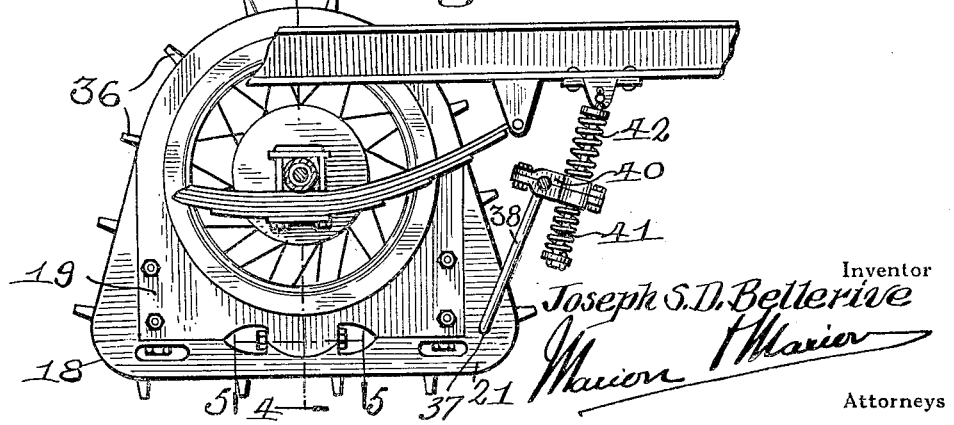

In the accompanying drawings forming a part of this specification and in which like reference characters are employed to designate corresponding parts throughout the same:

Figure 1 is a side elevational view of a vehicle showing the improved drive and runner attachments connected therewith, Figure 2 is a transverse sectional view through the vehicle chassis showing the drive mechanism associated with the rear drive wheels of the vehicle, Figure 3 is a fragmentary longitudinal section through the rear portion of the chassis, Figure 4 is an enlarged transverse section taken on the line 4—4 of Figure 3, Figure 5 is an enlarged fragmentary section taken on the line 5—5 of Figure 3, Figure 6 is an enlarged sectional view taken on the line 6—6 of Figure 2, Figure 7 is a side elevational view of the front runner attachment in separated relation, Figure 8 is a fragmentary elevational view of the rear drive attachment, partly in section, Figure 9 is an enlarged section taken on the line 9—9 of Figure 8, and Figure 10 is a fragmentary plan view of the drive chain.

Referring to the drawings, wherein for the purpose of illustration is shown a preferred embodiment of the invention, the numeral 10 generally designates a motor vehicle of conventional type having the customary front steering wheels 11 and rear drive wheels 12.

When connecting the snow drive attachment to the vehicle, the pneumatic tires thereof are removed from the wheels. To each of the front wheels 11 is connected a relatively flat runner 14 adapted to stand on its longitudinal edge and provided with an arcuate recess 15 adapted to be snugly fitted about the lower portion of the wheel. Over the upper portion of the wheel 11 is positioned an arcuate connecting bracket 16 provided with flanges at the ends thereof so that the bracket may be bolted to the runner for firmly connecting the runner to the wheel.

To each of the rear wheels of the vehicle is connected a chain drive frame, generally indicated at 18, embodying an inner section 19 adapted to be connected directly to the wheel and surrounding the same. The inner frame section 19 comprises a pair of transversely split parts securely connected by a bolt 20. When assembled, the section 19 is formed to provide an upper arcuately shaped portion extending over the upper portion of the drive wheel and a lower portion having an angular exterior contour.

Detachably connected with the section 19 is a substantially U-shaped outer complementary section 21 adapted to be slidably fitted over the lower portion of the inner section 19 and associated therewith so as to enable relative sliding adjustment. As shown to advantage in Figure 9, the sides of the section 19 are provided with a pair of opposed inwardly directed flanges 22 engaging grooves disposed in an inwardly projecting bar 23 formed at the end portions of the exterior section 21. The bar 23 is provided with vertically elongated slots 24 through which are extended bolts 25 projecting through the inner section 19. Relative vertical adjustment is effected through the medium of a screw 26 rotatably connected with the bottom portion of the frame 21, adjacent the end, and having a threaded connection with the lower end portion of the inner section.

When the sections 19 and 21 are operatively assembled, as shown to advantage in Figures 1 and 3, they provide a guide frame rounded at the upper portion over the drive wheel having an increasing taper toward the bottom to provide a relatively straight bottom portion and rounded at the corners.

Before mounting the interior frame section 19 about the drive wheel, an annular metallic rim 28 is tightly fitted about the exterior surface of the wheel felly, as illustrated in Figure 4. This metallic rim has a dual purpose; first to provide a support for a series of uniformly spaced sprocket teeth 29 revolving with the wheel, and secondly to form a race for an anti-friction roller bearing, the rollers 30 of which being equally distributed around the periphery of the wheel. Obviously, such a bearing, between the wheel and the inner section 19, is essential as otherwise the said sections would revolve with the wheel. Thus, the chain drive frame may be stationary and the wheel adapted to rotate inside, supported as it is on suitable roller bearings.

The periphery of the assembly runner frame structure 18 is formed to provide a continuous channel 31, provided with a slot in that portion of the frame extending over the upper portion of the drive wheel.

The channel structure 31 forms a guide for a continuous drive chain, generally indicated at 32, of a length suitable for continuous driving operation in the groove of the frame. The chain 32 is composed of alternate links carrying rollers 33 and intermediate links 34 provided with projections.

The projection forming links 34 are provided with inwardly directed teeth 35 arranged so as to be cooperatively engageable with the sprocket teeth 29 rotatable with the drive wheel. Projecting outwardly from each link 34 is a transversely elongated blade or cleat 36 designed to provide a secure snow or ground engaging medium.

In order to enable limited oscillatory movement of the frame assembly 18 as the bottom runner portion follows the uneven contour of the surface upon which the vehicle is travelling, a substantially U-shaped bracket member 38 is pivotally connected with the lower forward portion of each frame at 37, the intermediate portion of the bracket being bent to form an arcuate offset 39 to clear the drive shaft housing, as shown to advantage in Figure 2.

At each end of the transverse bar of the bracket 38 are disposed clamping members 40 having slidable connection with a rod 41 pivotally connected to the frame of the vehicle and depending therefrom. Disposed about the rod 41, at each side of the slidable clamp member 40, is a compression spring 42. Thus, this construction provides a connection between the frames attached to the drive wheels and the chassis frame of the vehicle to oppose any tendency on the part of the runner frames to rotate with the wheels, while allowing resilient movement of said runner frames on rough ground within predetermined limits. By means of this construction, the bottom runner portion of the wheel frames can mainly conform to rough ground to utilize the maximum traction.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. In a drive attachment for vehicles, a frame section adapted to encircle a drive wheel so that the drive wheel is rotatable therein. a complementary substantially U-shaped frame section adjustably connected with the wheel encircling section to form a runner extension, the said assembled sections being formed to provide a continuous peripheral groove therein, a continuous chain movably mounted in the said groove, the said chain being formed with inwardly projecting teeth and outwardly extending ground engaging cleats, and means connected to the drive wheel for driving the chain.

2. In a drive attachment for vehicles, a frame section adapted to encircle a drive wheel so that the drive wheel is rotatable therein, a complementary substantially U-shaped frame section adjustably connected with the wheel encircling section to form a runner extension, the said assembled sections being formed to provide a continuous peripheral groove therein, a continuous chain movably mounted in the said groove, the said chain being formed with inwardly projecting teeth and outwardly extending ground engaging cleats, a rim secured on the periphery of the drive wheel, and chain engaging sprocket teeth projecting from the rim for operatively driving the chain.

3. In a drive attachment for vehicles, a frame section adapted to encircle a drive wheel so that the drive wheel is rotatable therein, a complementary substantially U-shaped frame section adjustably connected with the wheel encircling section to form a runner extension, the said assembled sections being formed to provide a continuous peripheral groove therein, a continuous chain movably mounted in the said groove, the said chain being formed with inwardly projecting teeth and outwardly extending ground engaging cleats, a rim secured on the periphery of the drive wheel, chain engaging sprocket teeth projecting from the rim for operatively driving the chain, and mechanism connecting the asembled frame sections with the vehicle chassis whereby the runner frames may be resiliently oscillated within a limited arcuate movement.

4. In a drive attachment for vehicles, a frame section adapted to encircle a drive wheel so that the drive wheel is rotatable therein, a complementary substantially U-shaped frame section adjustably connected with the wheel encircling section to form a runner extension, the said assembled sections being formed to provide a continuous peripheral groove therein, a continuous chain movably mounted in the said groove, the said chain being formed with inwardly projecting teeth and outwardly extending ground engaging cleats, a rim secured on the periphery of the drive wheel, chain engaging sprocket teeth projecting from the rim for operatively driving the chain, and a bracket attached to the runner frame having connection with a resilient support to allow limited oscillating movement of the runner frame.

In witness whereof I have hereunto set my hand.

JOSEPH S. D. BELLERIVE.